United States Patent [19]

Wates

[11] Patent Number: 4,827,965

[45] Date of Patent: May 9, 1989

[54] NITROGEN/CARBON DIOXIDE MIXING VALVES

[75] Inventor: Michael J. Wates, Morton-in-Marsh, England

[73] Assignee: Norgren Martonair Limited, Lichfield, England

[21] Appl. No.: 84,561

[22] Filed: Aug. 12, 1987

[30] Foreign Application Priority Data

| | | | |
|---|---|---|---|
| Aug. 22, 1986 | [GB] | United Kingdom | 8620453 |
| Dec. 3, 1986 | [GB] | United Kingdom | 8628951 |

[51] Int. Cl.[4] .......... F16K 11/14

[52] U.S. Cl. .......... 137/88; 137/7; 137/114; 137/209; 141/37; 222/399; 251/75

[58] Field of Search .......... 137/88, 100, 114, 595, 137/607, 7, 209, 505.14; 141/4, 37 X, 46; 222/399 X, 400.7; 251/75, 297, 82, 83

[56] References Cited

U.S. PATENT DOCUMENTS

| | | | |
|---|---|---|---|
| 968,736 | 8/1910 | Brent | 222/399 |
| 1,365,476 | 1/1921 | Fuller | 251/83 |
| 2,311,061 | 2/1943 | Lutherer | 137/114 |
| 2,569,378 | 9/1951 | Hood | 222/399 X |
| 2,800,915 | 7/1957 | Tavener | 137/88 |
| 3,386,065 | 5/1968 | Algino | 251/75 X |
| 3,472,264 | 10/1969 | Petry | 251/297 X |
| 3,476,133 | 11/1969 | Stedfeld | 251/297 X |
| 3,642,021 | 2/1972 | Muller et al. | 137/114 |
| 4,364,493 | 12/1982 | Raynes et al. | 137/114 X |
| 4,549,563 | 10/1985 | Monnier . | |
| 4,615,352 | 10/1986 | Gibot | 137/88 X |

FOREIGN PATENT DOCUMENTS

| | | | |
|---|---|---|---|
| 901918 | 6/1972 | Canada | 137/88 |
| 2096303 | 2/1972 | France . | |

*Primary Examiner*—Stephen Hepperle

*Attorney, Agent, or Firm*—Cushman, Darby & Cushman

[57] ABSTRACT

$N_2$ and $CO_2$ are admitted, through separate valves actuated by single high hysteresis actuator, into a mixing device when the mixture is fed to a beer keg. The actuator is dependant upon the relative $Co_2N_2$ mixture pressures so as to maintain the mixture pressure within predetermined limits and in one embodiment the use of a venturi mixing device ensures that the mixture composition remains substantially constant when the $N_2$ and $CO_2$ gases are at substantially different pressure.

12 Claims, 4 Drawing Sheets

NITROGEN/CARBON DIOXIDE MIXING VALVES

BACKGROUND OF THE INVENTION

This invention relates to gas mixing and supply apparatus.

Pressurised gases, typically carbon dioxide, are commonly used for the dispensing of carbonated beverages such as beer and lager. With certain beverages, however, it is desirable or even essential to use a mixture of pressurised gases, for example carbon dioxide and nitrogen. In those cases, it is usually necessary not only for the mixture constantly to contain more or less predetermined proportions of the constituent gases (e.g. 70% volume nitrogen and 30% volume carbon dioxide) but also for the working pressure (i.e. the pressure applied to the beverage to dispense it) to be maintained within fairly specific limits. Hitherto, this has been achieved by providing a source of pressurised gas mixture specifically for use with the beverage in question. In particular, specially designed kegs each having a beverage-containing cavity and a separate pressurised gas-containing cavity have been used. Not only are those very expensive to produce, but also it would be advantageous to be able to utilise, as the source of the carbon dioxide constituent of the mixture, the source thereof used to dispense other carbonated beverages on the same premises, the other constituent(s) of the mixture, such as nitrogen, being mixed with it on the premises. It is an object of the present invention to provide means for achieving this, having regard to the mixture composition and pressure criteria referred to above.

SUMMARY OF THE INVENTION

According to a first aspect of the present invention, there is provided gas mixing and supply apparatus comprising:

(a) a first on/off valve having an inlet connectable to a source of a first gas under substantially constant pressure, and an outlet, (b) a second on/off valve having an inlet connectable to a source of a second gas under substantially constant pressure, and an outlet, (c) a mixing chamber having a first inlet connected to the outlet of said first valve, a second inlet connected to the outlet of said second valve, and an outlet connectable to a pipeline for supplying the mixture of said first and second gases generated in the chamber to a point of use, for example beverage dispensing apparatus, and (d) actuating means for actuating said first and second valves, the actuating means being operable in dependence upon the gas pressure prevailing, in use, in the outlet side of the mixing chamber ("the outlet pressure") such that, when the outlet pressure is at (or below) a pre-determined lower value, the actuating means causes the first and second valves to open, whereby the first and second gases mix within the mixing chamber until the outlet pressure attains a pre-determined upper value, whereupon the actuating means causes the first and second valves to close and that when the outlet pressure drops (consequent on consumption of gas mixture at the point of use) to said pre-determined lower value the actuating means causes the first and second valves to re-open until the said upper value of the outlet pressure is again attained and so on, whereby the outlet pressure is, in use, maintained substantially within said upper and lower values.

By using apparatus of the invention, the outlet pressure (i.e., the pressure of the gas mixture issuing from the outlet of the mixing chamber) can be maintained within limits acceptable in the particular application concerned, such as the dispensing of certain beers, whilst ensuring that the mixture composition remains substantially constant.

In a preferred application of apparatus of the invention, namely the dispensing of certain carbonated beverages, the first gas is nitrogen and the second gas is carbon dioxide, the latter conveniently being derived from the carbon dioxide source usually present on licensed and like premises. For example, apparatus of the invention may conveniently be connected to a carbon dioxide "ring main" containing carbon dioxide regulated at, for example, a pressure of about 35 psi (2.5 kg/cm$^2$) and which would typically be used to pressurise a variety of beverages. Usually, the gas mixture would need to be maintained at approximately the same pressure, e.g., between about 30 and 35 psi (2.1 kg/cm$^2$ and 2.5 kg/cm$^2$). In such a case, difficulties arise in generating, by simple mixing, a mixture of substantially constant composition because of the low $CO_2$ flow rate that would be involved. However, this difficulty may be overcome by using a preferred embodiment of apparatus of the invention in which the mixing chamber is part of a venturi mixing device. More particularly, the first inlet comprises a main inlet for, say, nitrogen and the second inlet comprises an auxiliary inlet for carbon dioxide gas, the inlet pressure of the nitrogen gas being significantly greater than that of the carbon dioxide inlet pressure and of the outlet pressure. Thus, upon opening of the first and second valves, the nitrogen serves to suck-in carbon dioxide, on the venturi principle, in a controlled manner so as to generate a mixture of pre-determined, substantially constant composition. As a guide, where the carbon dioxide inlet pressure (equal to the ring main pressure) is about 35 psi (2.5 kg/cm$^2$) and the outlet pressure is between about 30 and 35 psi (2.1 kg/cm$^2$ and 2.5 kg/cm$^2$), the nitrogen pressure would typically be chosen to be about 50 psi (3.5 kg/cm$^2$).

In a preferred embodiment of apparatus of the invention, the actuating means for the first and second valves comprises a double-acting piston or diaphragm arrangement having high hysteresis characteristics whereby the valves are opened and closed at significantly different pressures corresponding, respectively, to the lower and upper outlet pressure values referred to above. Such characteristics may be realised by providing means that will restrain, in a controlled manner, movement of the piston or diaphragm arrangement in one direction, but substantially not in the other. Such means may comprise, for example, spring loaded balls or spring discs that co-operate with the piston or diaphragm arrangement in appropriate manner. Preferably, the actuating means automatically operates, as is described in more detail below with reference to the drawings, simply by virtue of pressure differentials across it e.g. the differential between the outlet pressure and the pressure of the carbon dioxide. In this way, the apparatus may be quickly installed simply by connecting it to the two gas sources and to the pipeline that supplies the gas mixture to its point of use e.g., a beer keg, followed by adjustment as appropriate of the feed pressures of the two gases that are to be mixed. However, it will be apparent to those skilled in the art that alternative forms of actuating means may be used utilising, for example, electropneumatic circuits responsive, inter alia, to the outlet pressure.

Preferably the ratio of the inlet pressures of the two gases is substantially fixed.

According to a second aspect of the present invention, there is provided means for controlling the flow of gases that are to be mixed together comprising first and second on/off valves, and actuating means therefor, as defined above in relation to the first aspect of the invention.

BRIEF DESCRIPTION OF THE DRAWINGS

A preferred embodiment of apparatus of the invention will now be described, by way of example only, with reference to the accompanying drawings of which.

DESCRIPTION OF THE PREFERRED EMBODIMENT

Figure 1:
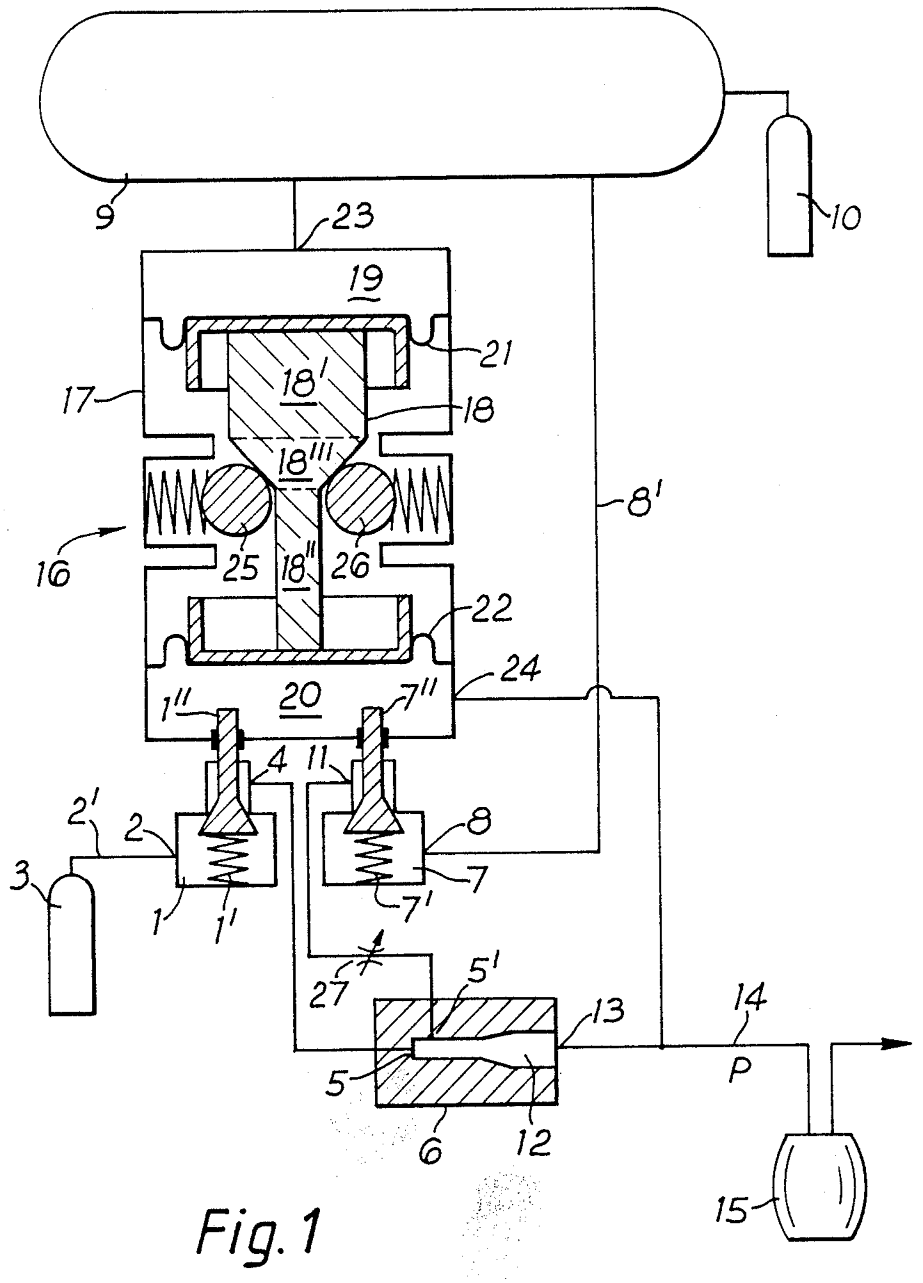
FIG. 1 is a diagramatic representation of apparatus shown connected to various gas pipelines. This apparatus is not included within the present invention because the valves thereof can snap open, but not snap closed.

Referring firstly to FIG. 1, the apparatus comprises a first on/off valve 1, urged into its off (closed) position by a spring 1', whose inlet 2 is connected by a pipeline 2' to a nitrogen cylinder 3 provided with the usual regulating valve (not shown) for supplying nitrogen at a constant pressure, for example 50 psi (3.5 kg/cm$^2$). The outlet 4 of the valve 1 is connected to the main inlet 5 of a venturi gas mixing device 6.

A second on/off valve 7 and spring 7' has an inlet 8 connected by a pipeline 8' to a carbon dioxide "ring main" 9 containing carbon dioxide at a constant pressure, for example 35 psi (2.5 kg/cm$^2$), delivered to it from a $CO_2$ cylinder 10 also provided with the usual regulating valve (not shown). Usually, the ring main 9 will also feed a plurality of other stations for dispensing a variety of carbonated beverages. The outlet 11 of the second valve 7 is connected to an auxiliary inlet of the venturi mixing device 6.

The venturi mixing device includes a mixing chamber 12 and an outlet 13 through which the $CO_2/N_2$ mixture issues into a pipeline 14 which conveys it to a keg, or plurality of kegs, 15 to be pressurised.

The valves 1 and 7 are, in use, simultaneously actuated by actuating means designated generally 16. The actuating means comprises a hollow body member 17 which houses an axially movable piston 18 whose opposed ends define, in part, a pair of opposed variable volume chambers 19, 20 within the body member 17. Opposed ends of the piston 18 are sealed against the side wall of the body member 17 by respective diaphragms 21,22. Alternatively, such sealing could be achieved by the use of O-rings located circumferentially of the piston 18.

The chamber 19 has an inlet 23 connected to the $CO_2$ ring main 9 and the chamber 20 has an inlet 24 connected to the pipeline 14.

The closure members of the valves 1 and 7 are associated with respective valve stems 1" and 7" which sealingly protrude into the chamber 20 and the respective ends of which are engageable by the end of the piston 18/diaghragm 22 as is described in more detail below. The piston 18 comprises two spaced cylindrical sections 18' and 18" of different external diameters merged by a central tapered section 18'''. The external surface of the piston 18 is abutted by a pair of opposed, spring-loaded ball detents 25 and 26. Accordingly, it will be seen that downwards movement of the piston 18 (as viewed in FIG. 1, although the valve/actuating means may, in use, be in any desired orientation) is, over the tapered section 18''' in particular, significantly resisted by the detents, whereas its upwards movement is actually somewhat enhanced. This imparts to the actuating means 16 the high hysteresis characteristic referred to earlier resulting in the differing pre-determined lower and upper values of the pressure P prevailing in the pipeline 14 at which the valves 1 and 7 are respectively opened and closed.

The apparatus functions as follows. Suppose the apparatus is in an 'off' mode, i.e. with all pipelines at atmospheric pressure (P in particular being atmospheric), the valves 1 and 7 thus being in their closed positions under the action of their respective springs 1' and 7' and the actuator 16 being in its neutral position (as shown in FIG. 1). The apparatus is made operational by turning on the regulating valves of the $N_2$ and $CO_2$ cylinders 3 and 10. Initially, the pressure within chamber 20 will equal P, i.e. atmospheric pressure but the pressure within chamber 19 will rapidly build up to the $CO_2$ pressure established in the ring main 9. Because of the pressure differential between the chambers 19 and 20, the piston 18 will gradually move downwards as the pressure in chamber 19 builds up, at the same time laterally displacing the spring-loaded ball detents 25 and 26, until the piston 18 reaches a position at which the detents 25 and 26 contact the transition between the tapered section 18''' and the cylindrical section 18'. At this point, the detents 25 and 26 offer no effective resistance to downward motion of the piston 18 and the piston 18 therefore rapidly moves further in a downward direction and contacts the ends of the valve stems 1", 7" thereby fully snapping open the valves 1 and 7. Simultaneously, nitrogen gas enters the venturi mixing device 6 via its inlet 5 as does carbon dioxide through the auxiliary inlet 5' whereupon the gases mix in chamber 12 and thence flow into the pipeline 14 via the outlet 13. The pressure P in the closed pipeline 14 therefore rapidly builds up, as does the pressure in the chamber 20. At a predetermined upper value of P, where P is slightly greater than the pressure prevailing in the $CO_2$ ring main 9, the pressure in chamber 20 will exceed that in the chamber 19 and, assisted by the ball detents 25 and 26, the piston 18 rapidly moves upwards, the valves 1 and 7 fully close and the apparatus attains a static, equilibrium position, as shown in FIG. 1, with P at its maximum value, for example at 35 psi (2.5 kg/cm$^2$). Initially (i.e., following the start up procedure just described), the gas mixture in pipeline 14 will not be of the desired composition because the carbon dioxide will not have been sucked in, as such, by the nitrogen as is the case during on-going operation of the apparatus. Rather, it will have issued into the mixing device 6 through the inlet 5' as a result of the difference between the $CO_2$ pressure [35 psi (2.5 kg/cm$^2$)] and the initial pipeline 14 pressure (P=atmospheric). This may, if necessary, be rectified by bleeding pipeline until P reaches its predetermined minimum pressure P min whereafter the desired mixture of $N_2/CO_2$ will continually be generated in pipeline 14 as will now be described.

With P=P max suppose that some beer is dispensed from the keg 15. Some of the gas in pipeline 14 will be consumed and the pressure P will drop. The differential pressure between chambers 19 and 20 will increase and the piston 18 will therefore begin to move downwards against the force exerted by the ball detents 25 and 26. This process will continue so long as there is a demand for beer from keg 15 until the detents 25 and 26 are overcome at a predetermined lower value of P (P min) whereupon valves 1 and 7 will again open and a further quantity of $N_2/CO_2$ mixture will be fed into pipeline 14 from the venturi mixing device 6 until P again reads P max, the $CO_2$ largely being sucked in by the higher-pressure $N_2$. The composition of the $N_2/CO_2$ mixture supplied to pipeline 14 during each re-pressurisation step may be adjusted to the required value (e.g. 70% by volume $N_2$ and 30% by volume $CO_2$) by means of a throttle valve 27 located in the $CO_2$ line. These cycles are thereafter repeated from time to time whereby pipeline 14 always contains an $N_2/CO_2$ mixture of substantially constant composition and within a predetermined pressure range.

Figure 2:
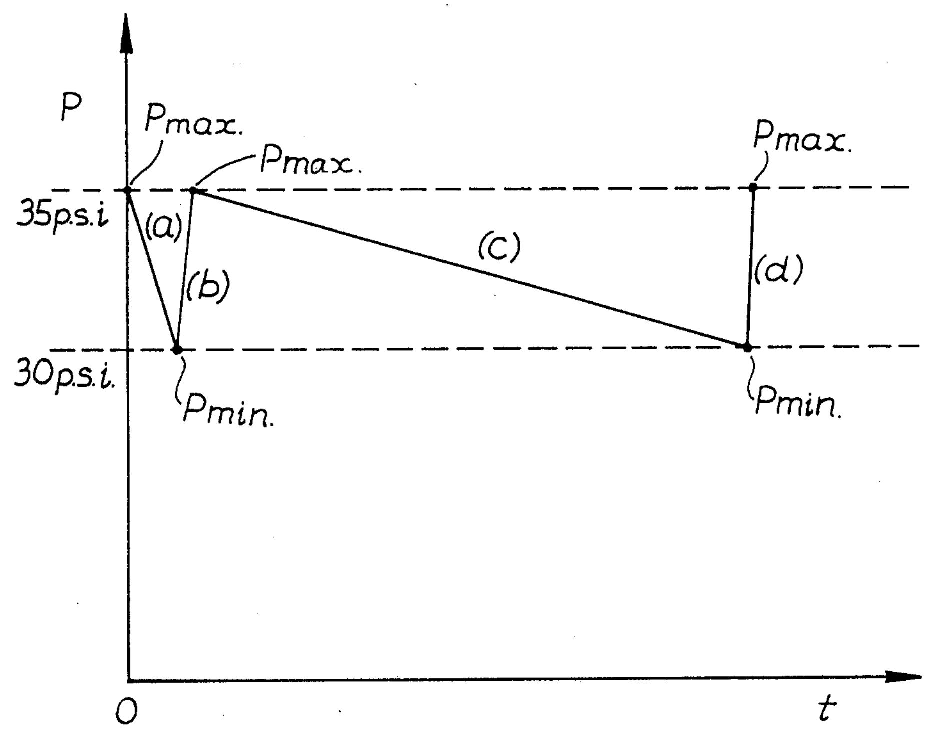
FIG. 2 is a graph of outlet pressure in relation to time illustrating operation of the apparatus of the invention during a typical beer dispensing situation.

Two typical cycles are illustrated in FIG. 2 of the accompanying drawings which is a graph of P against time. Starting at t=0, with P at its maximum value as described above (P max), as beer is dispensed, P gradually drops until its predetermined minimum value [P min=about 30 psi (2.1 kg/cm$^2$)] is reached as shown by line (a) in FIG. 2 whereupon the detents 25 and 26 are overcome and the valves 1 and 7 open. P then rapidly rises to P max again, as shown by line (b) in FIG. 2, whereupon the detents 25 and 26 reset and the valves 1 and 7 close. Lines (c) and (d) in FIG. 2 illustrate another such cycle, but where there is a lower demand for beer and, therefore, P drops to P min at a slower rate (line (c)) than in the case illustrated by line (a).

Whilst the above description relates specifically to the dispensing of beer or the like, it will be appreciated that apparatus of the invention may be used in any context where it is desired to generate a gas mixture of substantially constant composition and having a pressure within a particular range of values. It will be appreciated that the initial pressures of the $CO_2$ and $N_2$ must be kept within a relatively close ratio to one another, and this can be accomplished by any suitable pressure regulation means.

Figure 3:
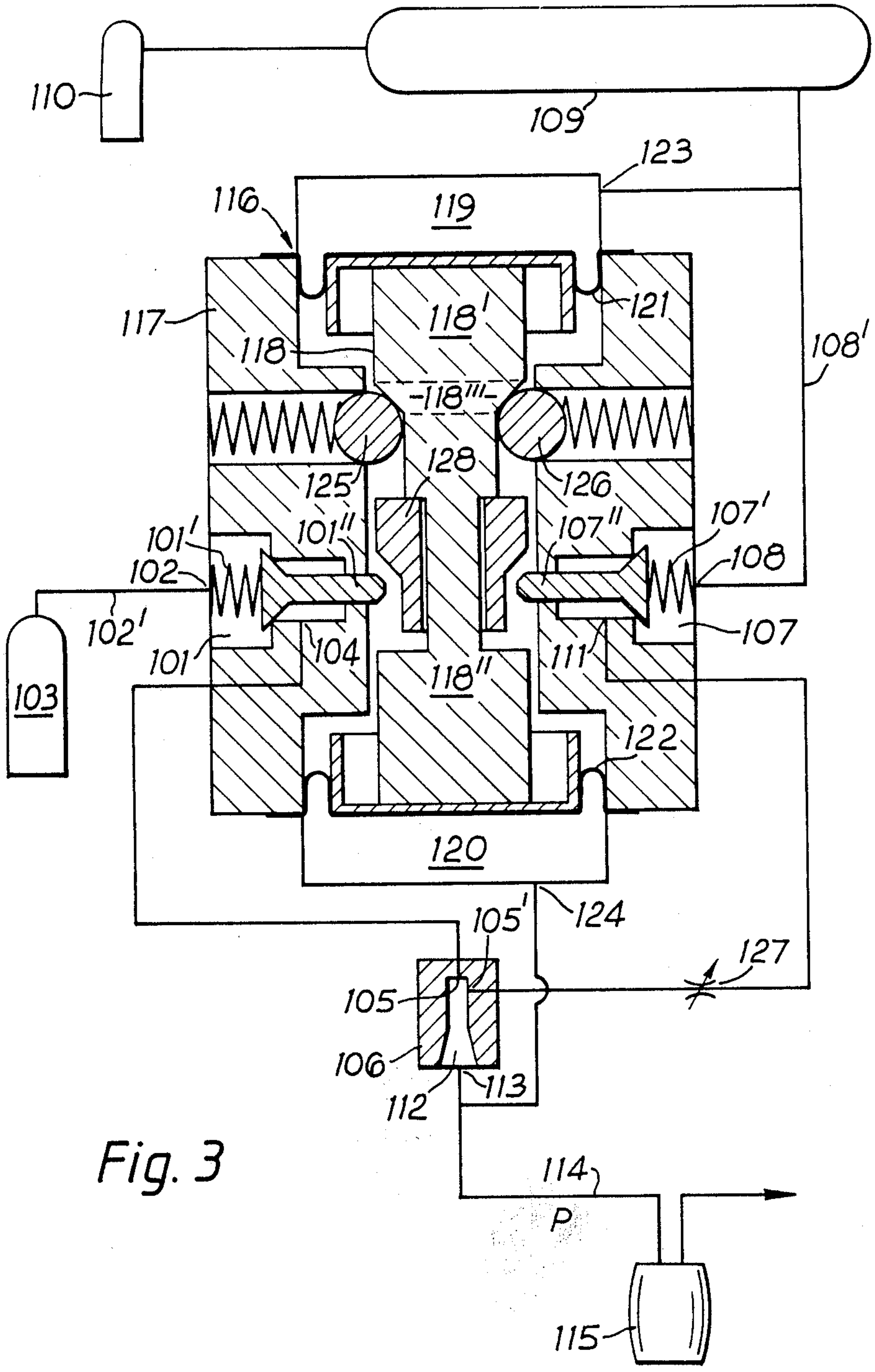
FIGS. 3 and 4 are schematic drawings of alternative valve designs for replacing the corresponding valves in the apparatus of FIG. 1 for providing the apparatus of the present invention. In the embodiments of FIGS. 3 and 4, the valves are capable, in use, of snapping both open and closed.

Referring to FIG. 3 a first embodiment of the apparatus embodying principles of the present invention comprises a first on/off valve 101, urged into its off (closed) position by a spring 101', whose inlet 102 is connected by a pipeline 102' to a nitrogen cylinder 103 provided with the usual regulating valve (not shown) for supplying nitrogen at a constant pressure, for example 50 psi (3.5 kg/cm$^2$). The outlet 104 of the valve 101 is connected to the main inlet 105 of a venturi gas mixing device 106.

A second on/off valve 107 and spring 107' has an inlet 108 connected by a pipeline 108' to a carbon dioxide "ring main" 109 containing carbon dioxide at a constant pressure, for example 35 psi (2.5 kg/cm$^2$), delivered to it from a $CO_2$ cylinder 110 also provided with the usual regulating valve (not shown). Usually, the ring main 109 will also feed a plurality of other stations for dispensing a variety of carbonated beverages. The outlet 111 of the second valve 107 is connected to an auxiliary inlet 105 of the venturi mixing device 106.

The venturi mixing device 106 includes a mixing chamber 112 and an outlet 113 through which the $CO_2/N_2$ mixture issues into a pipeline 114 which conveys it to a keg, or plurality of kegs 115 to be pressurised.

The valves 101 and 107 are housed in a hollow body member 117 and are, in use, simultaneously actuated by actuating means designated generally 116. The actuating means, which also is housed in the hollow body member 117, includes an axially movable piston 118 whose opposed ends define, in part, a pair of opposed variable volume chambers 119, 120 within the body member 117. Opposed ends of the piston 118 are sealed against the side wall of the body member 117 by respective diaphragms 121, 122. Alternatively, such sealing could be achieved by the use of O-rings located circumferentially of the piston 118.

The chamber 119 has an inlet 123 connected to the $CO_2$ ring main 109 and the chamber 120 has an inlet 124 connected to the pipeline 114.

The closure members of the valves 101 and 107 are associated with respective valve stems 101'' and 107'' which protrude radially into the hollow space of body member 117 surrounding the piston 118 and the respective ends of which are engageable by an annular cam member 128 mounted, with a degree of axial play, loosely on, and forming part of, the piston 118. The piston 118 includes two spaced cylindrical sections 118' and 118'' merged by a tapered section 118'''. The external surface of the piston 118 is abutted by a pair of opposed, spring-loaded detents 125 and 126. The detents illustrated are in the form of balls, but any suitable form of detent may be used. Accordingly, it will be seen that downwards movement of the piston 118 (as viewed in the drawing although the valve/actuating means may, in use, be in any desired orientation) is, over the tapered section 118''' in particular, significantly resisted by the detents, whereas its upwards movement is actually somewhat enhanced. This imparts to the actuating means 116 a high hysteresis characteristic resulting in differing pre-determined lower and upper values of the pressure P prevailing in the pipeline 114 at which the valves 101 and 107 are respectively snapped open and snapped closed.

The apparatus functional as follows. Suppose the apparatus is in an 'off' mode, i.e., with all pipelines at atmospheric pressure (P in particular being atmospheric), the valves 101 and 107 thus being in their closed positions under the action of their respective springs 101' and 107' and the actuator 116 being in its neutral position (as shown in the drawing). The apparatus is made operational by turning on the regulating valves of the $N_2$ and $CO_2$ cylinders 103 and 110. Initially, the pressure within chamber 120 will equal P, i.e., atmospheric pressure, but the pressure within chamber 119 will rapidly build up to the $CO_2$ pressure established in the ring main 109. Because of the pressure differential between the chambers 119 and 120, the piston 118 will gradually move downwards as the pressure in chamber 119 builds up, at the same time laterally displacing the spring-loaded ball detents 125 and 126, until the piston 118 reaches a position at which the detents 125 and 126 contact the transition between the tapered section 118''' and the cylindrical section 11'. At this point, the detents 125 and 126 offer no effective resistance to downward motion of the piston 118 and the piston 118 therefore rapidly moves further in a downward direction and the cam member 128 engages the ends of the valve stems 101″, 107″ thereby displacing them radially outwards and fully snapping open the valves 101 and 107. Simultaneously, nitrogen gas enters the venturi mixing device 106 via its inlet 105 as does carbon dioxide through the auxiliary inlet 105′ whereupon the gases mix in chamber 112 and thence flow into the pipeline 114 via the outlet 113. The pressure P in the closed pipeline 114 therefore rapidly builds up, as does the pressure in the chamber 120. At a predetermined upper value of P, where P is slightly greater than the pressure prevailing in the $CO_2$ ring main 109, the pressure in chamber 120 will exceed that in the chamber 119 and, assisted by the ball detents 125 and 126, the piston 118 rapidly moves upwards, eventually lifting lost motion annular cam member 128, the valves 101 and 107 fully snap closed as the ends of the valves run down the cam surfaces of the member 128 and displace it axially and the apparatus attains a static, equilibrium position, as shown in the drawing, with P at its maximum value, for example at 35 psi (2.5 kg/cm$^2$). Initially (i.e., following the start up procedure just described), the gas mixture in pipeline 114 will not be of the desired composition because the carbon dioxide will not have been sucked in, as such, by the nitrogen as is the case during on-going operation of the apparatus. Rather, it will have issued into the mixing device 106 through the inlet 105′ as a result of the difference between the $CO_2$ pressure [35 psi (2.5 kg/cm$^2$)] and the initial pipeline 114 pressure (P=atmospheric). This may, if necessary, be rectified by bleeding pipeline 114 until P reaches its predetermined minimum pressure P min whereafter the desired mixture of $N_2/CO_2$ will continually be generated in pipeline 114 as will now be described.

With P=P max suppose that some beer is dispensed from the keg 115. Some of the gas in pipeline 114 will be consumed and the pressure P will drop. The differential pressure between chambers 119 and 120 will increase and the piston 118 will therefore begin to move downwards against the force exerted by the ball detents 125 and 126. This process will continue so long as there is a demand for beer from keg 115 until the detents 125 and 126 are overcome at a predetermined lower value of P (P min) whereupon valves 101 and 107 will again open and a further quantity of $N_2/CO_2$ mixture will be fed into pipeline 114 from the venturi mixing device 106 until P again reads P max, the $CO_2$ largely being sucked in by the higher-pressure $N_2$. The composition of the $N_2/CO_2$ mixture supplied to pipeline 114 during each re-pressurisation step may be adjusted to the required value (e.g. 70% by volume $N_2$ and 30% by volume $CO_2$) by means of a throttle valve 127 located in the $CO_2$ line. These cycles are thereafter repeated from time to time whereby pipeline 114 always contains an $N_2/CO_2$ mixture of substantially constant composition and within a predetermined pressure range.

Figure 4:
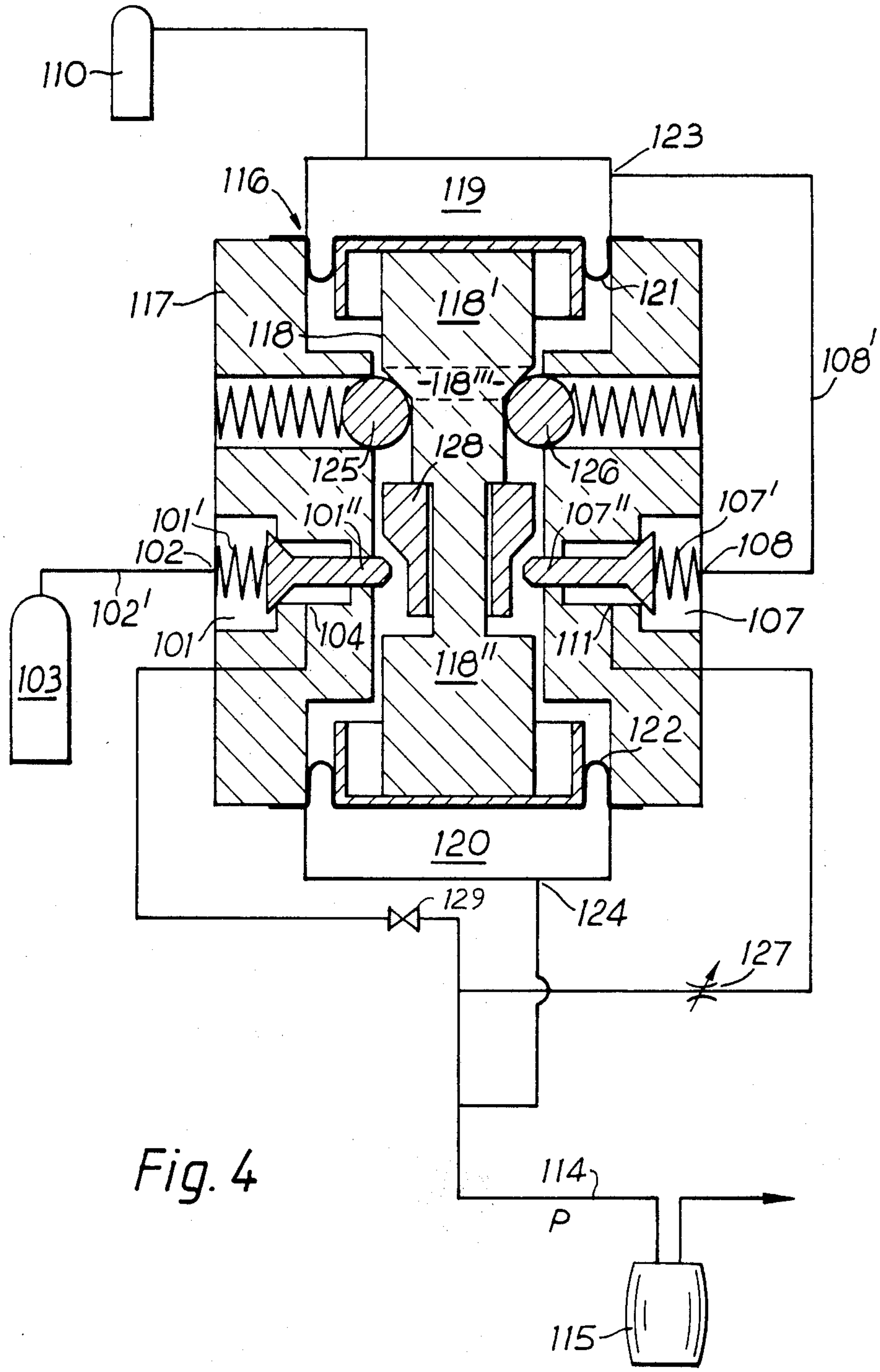

Referring to the embodiment in FIG. 4, this illustrates a modification of the embodiment illustrated in FIG. 3 in which the $CO_2$ is supplied from a separate cylinder 110 rather than from a $CO_2$ ring main. The pressure emerging from the cylinder 110 would be at 50 psi (3.5 kg/cm$^2$) rather than at 35 psi (2.5 kg/cm$^2$) as is the case with the ring main system described in FIG. 3. As a result, the area of the piston 118′ should be slightly less than the area of the piston 118″ so that the pressures will be balanced.

Because the $CO_2$ pressure is always higher than the pressure P, there is no need to provide a venturi mixing chamber and the mixing chamber merely comprises the junction between the $CO_2$ line and the $N_2$ line which is fitted with a restrictor 129. The ratio of the gases is dependant upon the ratio of the areas of the restrictors 127 and 129. In all other respects, the operation of the embodiment illustrated in FIG. 4 is identical to that of the embodiment illustrated in FIG. 3.

I claim:

1. Gas mixing and supply apparatus, comprising:

(a) a first on/off valve adapted to be snapped between a fully open position and a fully closed position, said first valve being an inlet connectable to a source of a first gas under substantially constant pressure, and an outlet;

(b) a second on/off valve adapted to be snapped between a fully open position and a fully closed position, said second valve having an inlet connectable to a source of a second gas under substantially constant pressure, and an outlet;

(c) a mixing chamber having a first inlet connected to the outlet of said first valve, a second inlet connected to the outlet of said second valve, and an outlet on an outlet side thereof, said outlet being connectable to a pipeline for supplying a mixture of said first and second gases generated in said mixing chamber, to a point of use, (d) bias-providing bistable detent means adapted to restrict opening of the valves and to ensure that the valves snap from said fully open to said fully closed position and from said fully closed to said fully open position; and (e) actuating means for actuating said first and second valves, the actuating means being operable in dependence upon the gas pressure prevailing as an outlet pressure, in use, in said outlet side of the mixing chamber, such that, when the outlet pressure is at or below a predetermined lower value, the actuating means overcomes the bias of the detent means and causes the first and second valves to snap from said fully closed position to said fully open position, whereby the first and second gases mix within the mixing chamber until the outlet pressure attains a pre-determined upper value, whereupon the actuating means causes the first and second valves to snap from said fully open position to said fully closed position and that when the outlet pressure drops to said pre-determined lower value the actuating means causes the first and second valves to again snap into said fully open position until the said upper value of the outlet pressure is again attained, whereby the outlet pressure is, in use, maintained substantially within said upper and lower values.

2. Apparatus as claimed in claim 1, in which:
said actuating means comprises an actuating piston movable in response to the gas pressure.

3. Apparatus as claimed in claim 2, in which:
the piston requires a greater force to fully open the first and second on/off valves compared to the force required to fully open them.

4. Apparatus as claimed in claim 3, in which:
the bistable detent means comprises a piston movable in response to the inlet pressure of one of the gases.

5. Apparatus as claimed in claim 3, in which:

said piston is provided with a camming surface to move a resilient detent member to provide the bistable detent means.

6. Apparatus as claimed in claim 5, in which:
said piston of the bistable detent means operates said actuating means via a lost-motion mechanism.

7. Apparatus as claimed in claim 1, in which:
said mixing chamber comprises a venturi chamber.

8. Apparatus as claimed in claim 1, in which:
said mixing chamber comprises a junction between two pipelines respectively carrying the two gases from respective sources.

9. Apparatus as claimed in claim 8, in which:
said two pipelines are fitted with restrictors to determined a mixture ratio of the two gases.

10. Apparatus as claimed in claim 9, in which:
the ratio of the inlet pressures of the two gases is substantially fixed.

11. Apparatus as claimed in claim 8, in which:
one said gas is nitrogen and the other said gas is carbon dioxide.

12. Apparatus as claimed in claim 8, in which:
said outlet of said mixing chamber is connected to a pipeline for supplying a mixture of said first and second gases to a beer dispenser for dispensing beer therefrom.

* * * * *